United States Patent [19]
Schnitzler et al.

[11] 3,893,422
[45] July 8, 1975

[54] MILKING UNIT SUPPORT AND DETACHER MECHANISM

[75] Inventors: James J. Schnitzler; Gary W. Schluckbier, both of Madison; Paul E. Krueger, McFarland, all of Wis.

[73] Assignee: DEC International, Inc., Madison, Wis.

[22] Filed: May 10, 1974

[21] Appl. No.: 468,925

[52] U.S. Cl. .......................................... 119/14.08
[51] Int. Cl. ............................................ A01j 5/04
[58] Field of Search............. 119/14.08, 14.1, 14.14

[56] References Cited
UNITED STATES PATENTS

| | | | |
|---|---|---|---|
| 3,603,292 | 9/1971 | Finch.............................. | 119/14.08 |
| 3,690,300 | 9/1972 | Tonelli............................. | 119/14.08 |
| 3,789,798 | 2/1974 | Reisgies et al................... | 119/14.08 |

*Primary Examiner*—Hugh R. Chamblee
*Attorney, Agent, or Firm*—Michael, Best & Friedrich

[57] ABSTRACT

A milking unit support and detacher mechanism including a vertical column assembly and a horizontally extending retractable milker unit support assembly mounted at the lower end of the column assembly. The vertical column assembly is comprised of an outer tubular jacket and an inner support tube slidably mounted inside the jacket. The inner support tube is supported for vertical movement by means of a threaded rod, the upper end of which is supported from and drivingly connected to motor gear box unit. The lower end of the rod is threaded through an internally threaded collar secured to the top of the support tube. The retractable milker unit support assembly is comprised of four link members pivotally connected together in end-to-end relationship. The link assembly is retracted by means of a ball chain fastened at one end to the end link member and threaded back through openings in the two link members next adjacent the end link member. The other end of the chain link is connected to rotatably mounted hub member. The ball chain is reeled up on the hub by a motor drive to thereby cause the link members to fold up on themselves which in turn will cause the milker unit to be retracted from underneath the cow.

20 Claims, 6 Drawing Figures

PATENTED JUL 8 1975  3,893,422

SHEET 1

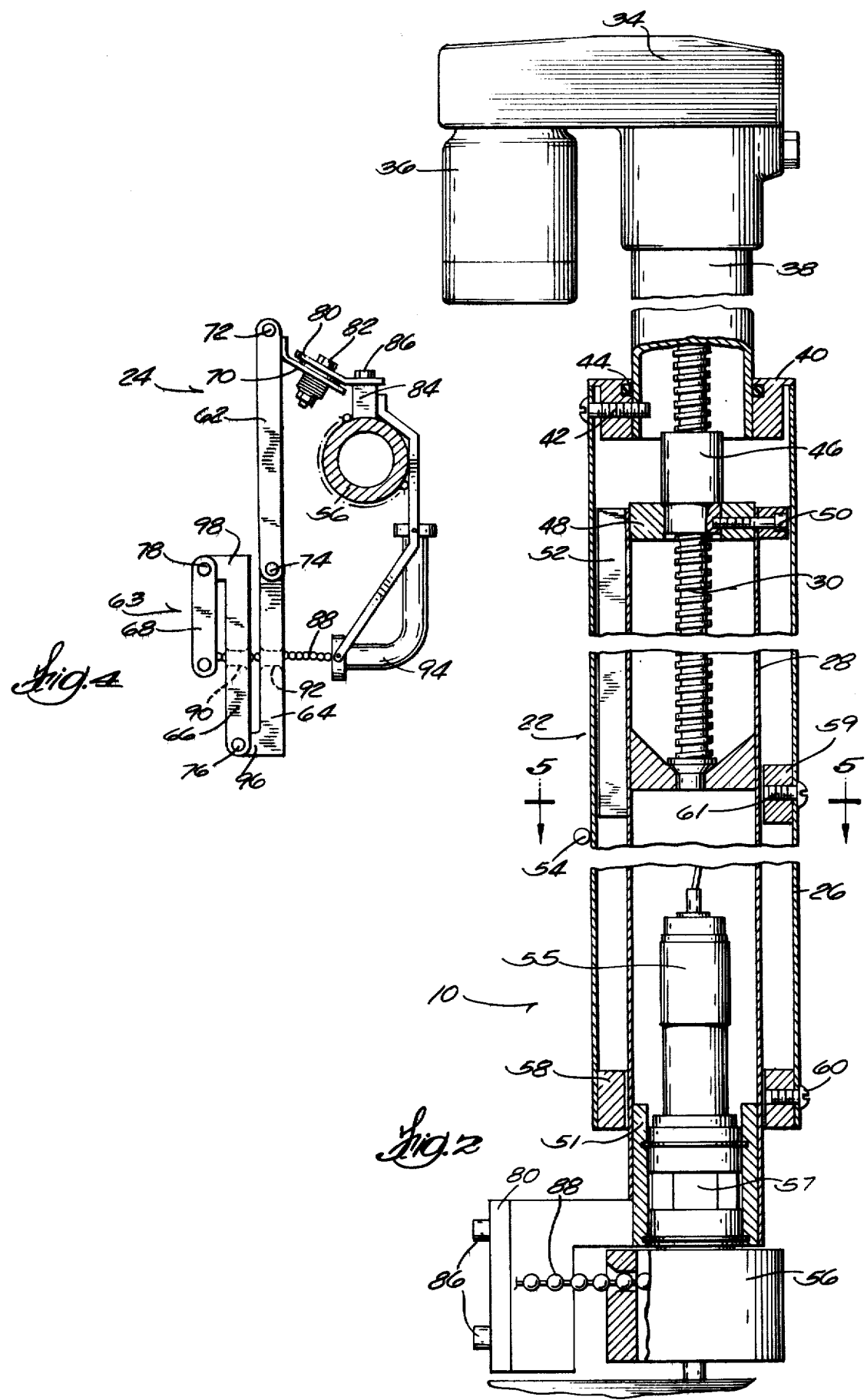

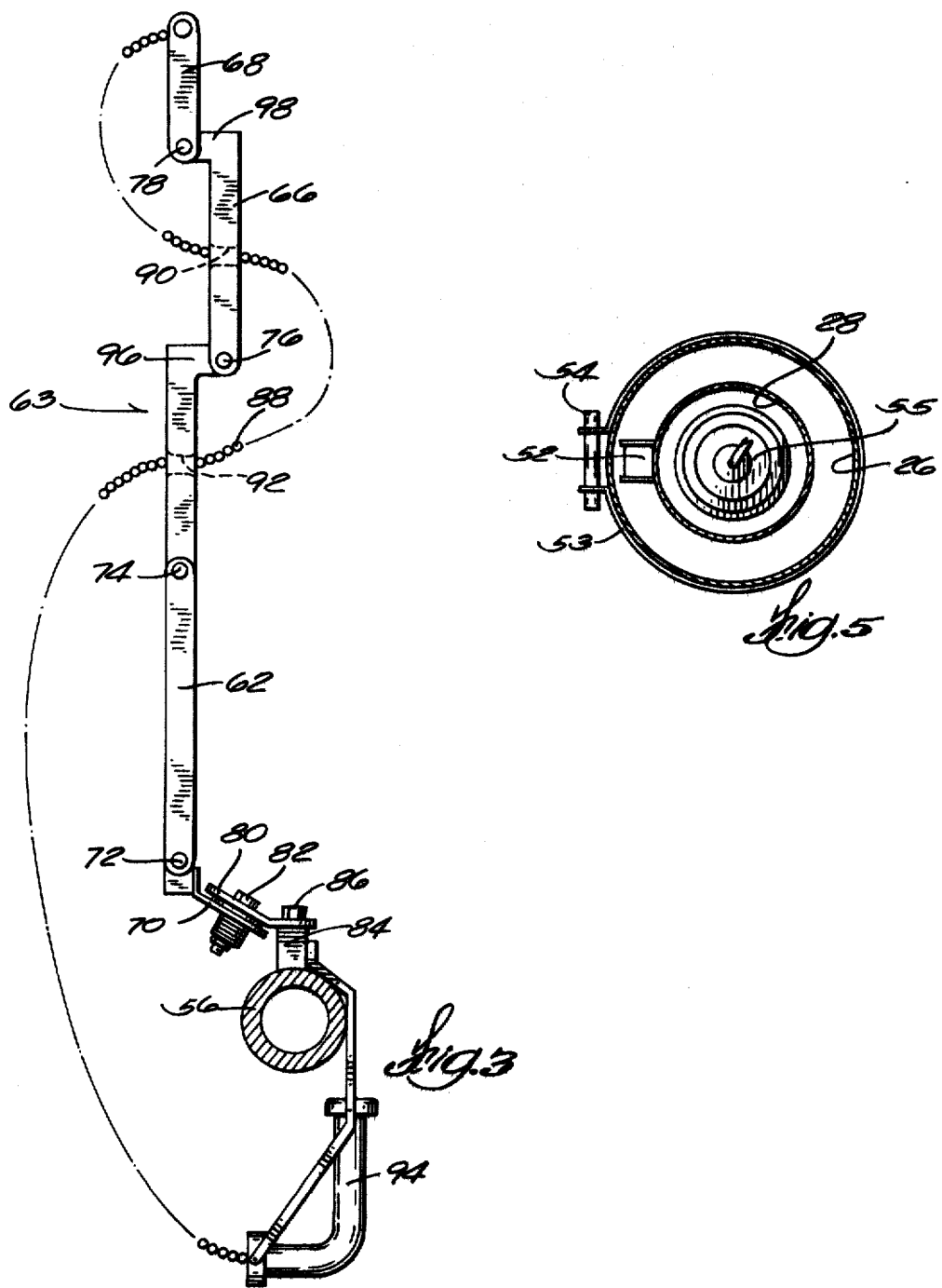

MILKING UNIT SUPPORT AND DETACHER MECHANISM

BACKGROUND OF THE INVENTION

1. Field of the Invention

This invention relates to a milking unit support and detacher mechanism and more particularly to such a mechanism which operates automatically upon completion of the milking cycle to cause the milking unit supported on the mechanism to be retracted from underneath the cow.

2. Description of the Prior Art

Prior mechanisms of this general type known to applicant are shown in U.S. Pat. Nos. 3,246,631, 3,556,053, 3,603,292 and 3,690,300. The principal problems in the prior art mechanisms referred to above is the complexity of the mechanisms resulting in relatively high cost and low reliability.

SUMMARY OF THE INVENTION

A milking unit support and detacher mechanism comprising a main support assembly and a horizontally extending retractable milking unit support assembly mounted on the lower portion of the main support assembly. The retractable milker unit support is comprised of a plurality of horizontally extending link members pivotally connected together in end-to-end relationship and adapted to support a milker unit on the outer link thereof. A flexible retract member is fastened at one end to the end link member and threaded back through openings in the two next adjacent link members. A retract means in the form of a rotatably mounted hub and a motor drive therefor will cause the flexible retract member to be reeled up on the hub to thereby cause the link members to fold up on themselves which in turn will cause the milker unit to be retracted from underneath the cow. The main support assembly includes a vertical adjustment means for adjusting the vertical elevation of the retractable milker unit support assembly mounted thereon. Such adjustment means includes a vertically extending support member on which the milker support assembly is mounted and a lift motor operatively connected to the vertical support member to drive it up and down as desired.

A control means is provided for automatically initiating the actuation of the retract means at a predetermined point in the milking cycle (preferably when milk flow from the milker unit reaches a predetermined minimum amount). The control means is also operative to shut off the vacuum to the milker unit before said retract means is operated. The control means is further operative to automatically actuate the vertical adjustment means in the up direction when the milker unit support assembly is retracted to thereby reduce the likelihood of contact between the milker unit teat cups and the ground during retraction thereof.

The mechanism of this invention is of relatively simple design and provides a smooth, positive and quiet retraction of the milker unit with the retracted link assembly folded into a compact assembly to permit easy access to the cow's udder for prepping the cow prior to attachment of the milker unit.

DESCRIPTION OF THE DRAWINGS

FIG. 2 is a fragmentary side elevation view (with parts broken away) of a portion of the detacher mechanism shown in FIG. 1; and FIG. 3 is a fragmentary sectional view taken along line 3—3 of FIG. 2 and showing the retractable arm assembly in completely extended position;

FIG. 4 is a view similar to FIG. 3 but with the mechanism in retracted position;

FIG. 5 is a sectional view taken along line 5—5 of FIG. 2; and

DESCRIPTION OF THE PREFERRED EMBODIMENT

Figure 1:
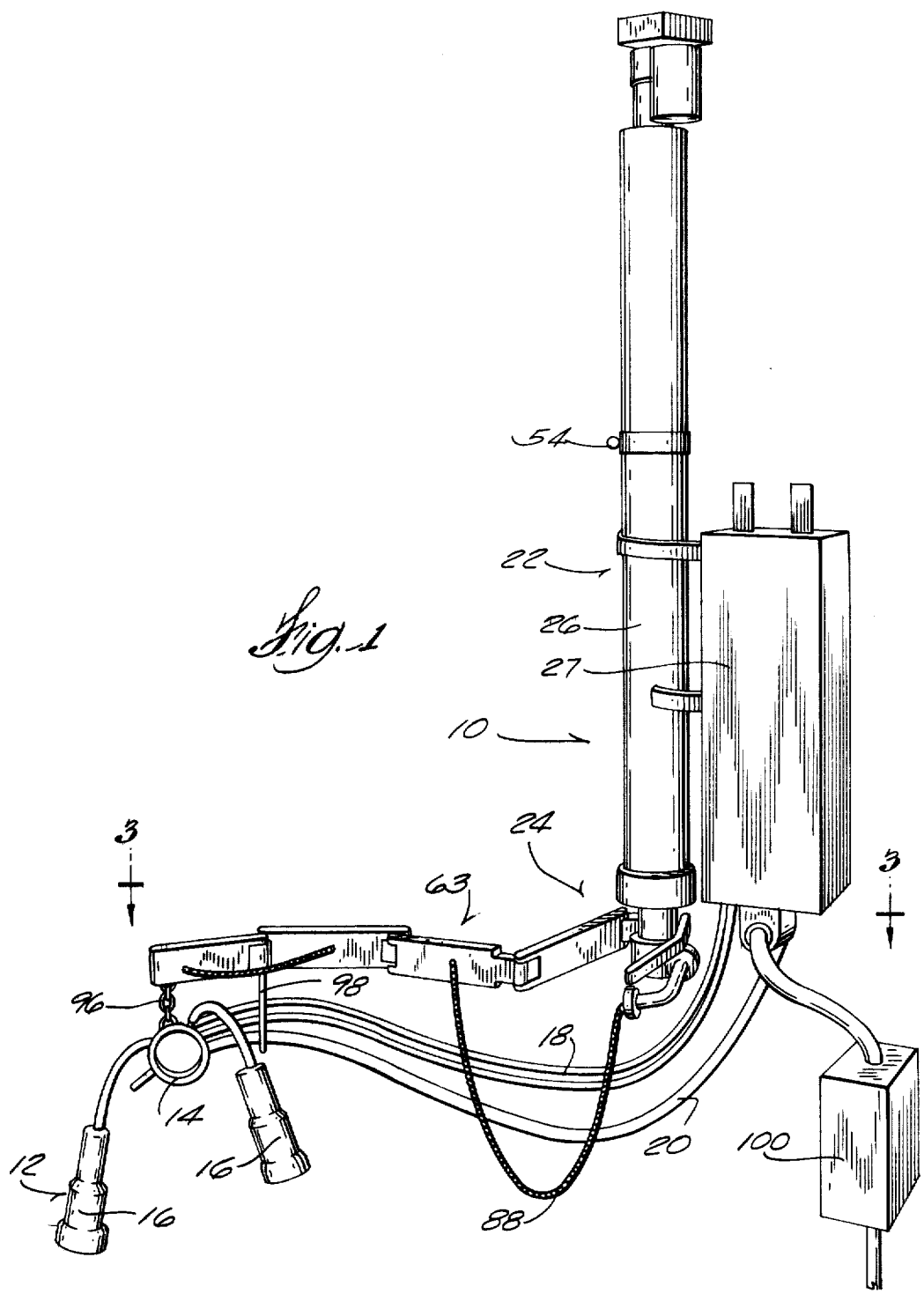
FIG. 1 is a perspective view of a teat cup detacher mechanism made in accordance with the present invention.

Referring to FIG. 1, the detacher mechanism which is indicated generally by reference numeral 10 is adapted to be used with a milking apparatus 12 of any suitable design. The milking apparatus 12 shown in FIG. 1 is comprised of a claw unit 14, a plurality of teat cups 16, vacuum lines 18 and a milk line 20.

The detacher mechanism 10 is comprised of two basic sub-assemblies, namely, a vertical column assembly 22 and a horizontally extending retractable milker unit support assembly 24 mounted at the lower end of column assembly 22.

Vertical column assembly 22 is comprised of an outer stationary cylindrical jacket 26 which is supported adjacent a milking stall by any suitable support structure (not shown) and an inner support tube 28 concentrically mounted inside jacket 22. A control box 27 is mounted on jacket 26 as shown in FIG. 1. Support tube 28 is supported for vertical movement inside of jacket 22 by means of a threaded rod member 30. The upper end or rod 30 is supported from and is in driven engagement with a gear box unit 34. Gear box 34 is driven by a reversible lift motor 36. The lift motor 36 and gear box 34 assembly may be of any conventional design and thus a detailed description of the construction of this equipment will not be set forth herein. The motor and gear box assembly are supported on the upper end of jacket member 26 by means of a tube member 38 which in turn is secured to the top of jacket 26 by means of a cap member 40 and a machine screw 42. The joint between tube 38 and cap 40 is sealed by an O-ring member 44.

Rod 30 is threaded through an internally threaded collar member 46 which in turn is secured to the top of support tube 28 by means of a ring member 48 and a cap screw 50.

An elongated permanent magnet member 52 is mounted on the side of inner tube 28 for cooperation with a reed switch assembly 54 mounted on the outside of jacket 26. The reed switch is attached to the outside of jacket 26 by means of a strap member 53 to facilitate vertical adjustment of the reed switch on the jacket. The operational relationship of magnet 52 and reed switch assembly 54 will be described in detail hereinafter.

A retract motor 55 is mounted inside the lower end of tube 28 by a sleeve member 51 and is drivingly connected to a retract hub 56 by a shaft 57 which extends outwardly and downwardly through the end of sleeve 51. The lower end of tube 28 is guided inside jacket 26 by a guide member 58 which is fastened in the lower end of jacket 26 by a machine screw 60. The central portion of tube 28 is guided by a slotted guide member 59 fastened to jacket 26 by a machine screw 61.

It will be appreciated from the foregoing description that support tube 28 can be raised and lowered vertically inside jacket 26 by operation of the lift motor 36. Such vertical adjustment of support tube 28 will in turn serve to cause a corresponding vertical adjustment of the retractable milker unit support assembly 24 as will be described hereinafter.

As best shown in FIGS. 3 and 4 assembly 24 includes a retractable link assembly 63 comprised of a plurality of pivotally connected link members 62, 64, 66 and 68. The first link member 62 is pivotally mounted on a bracket member 70 by a pin 72 and the four link members 62, 64, 66 and 68 are pivotally connected to each other in end-to-end relationship by pins 74, 76 and 78.

Bracket 70 is fastened to a second bracket 80 by a bolt, nut, friction plate and spring assembly 82, and bracket 80 is fastened to a main support fitting 84 by a pair of machine screws 86.

Support fitting 84 is fastened to sleeve 51 so that the entire retractable milker unit assembly 24 will be securely mounted at and supported from the lower end of the vertical column assembly 22.

The friction, nut and bolt assembly 82 connecting bracket 70 to bracket 80 serves as a friction clutch to permit relative rotation of the two brackets when a shock force is applied to the retractable link assembly 63. Thus should such a force be applied by a kick from a cow, for example, the force will be absorbed by assembly 82 (causing bracket 70 to be rotated) to thereby prevent damage to the mechanism which might otherwise occur. In such event the retractable link assembly 63 can be readily restored to its proper horizontally extending position by simply gripping the link assembly 63 and firmly rotating it back to its proper horizontal position.

Retractable support assembly 24 further includes a flexible retract member 88 which in the preferred embodiment is in the form of a ball chain. As best shown in FIG. 3, chain 88 is fastened at its outer end to the end link member 68 and is thereafter threaded back through an opening 90 in link 66, an opening 92 in link 64 and then through a ball chain guide tube 94 to retract hub 56 to which the inner end of the chain 88 is fastened.

A flexible support 96 in the form of a short length of chain is fastened to the end of link 68 from which milk unit 12 is supported. Pivot pin 78 is provided with a depending hook portion 98 for supporting the vacuum and milk lines 18 and 20 as shown in FIG. 1. It will be apparent from the foregoing that when motor 55 is energized to rotate hub 56 in a counterclockwise direction as viewed in FIG. 3, chain 88 will be wound up on the hub causing link assembly 63 to be folded back from its extended position (FIG. 3) to its retracted position (FIG. 4).

It will be noted that pins 76 and 78 are mounted in offset portions 96 and 98 on links 64 and 66, respectively, so that when the link assembly is fully retracted, the lines 64, 66 and 68 will assume a compact, parallel relationship as shown in FIG. 4.

OPERATION

With the retractable support assembly 24 in retracted position (FIG. 4) the assembly is moved to extended position manually by the operator. The vertical position of assembly 24 is adjusted to the proper height for the cow to be milked by operation of the reversible lift motor 36. This vertical adjustment is also performed by the operator by any suitable control instrumentality such as a switch (not shown) mounted adjacent the stall. The operator adjusts the vertical position of assembly 24 to a position wherein the milker unit is completely free floating with respect to the cow's udder. The flexible support member 96 permits a limited amount of relative movement between the cow and the milker unit without disturbing the free floating relationship.

Figure 6:
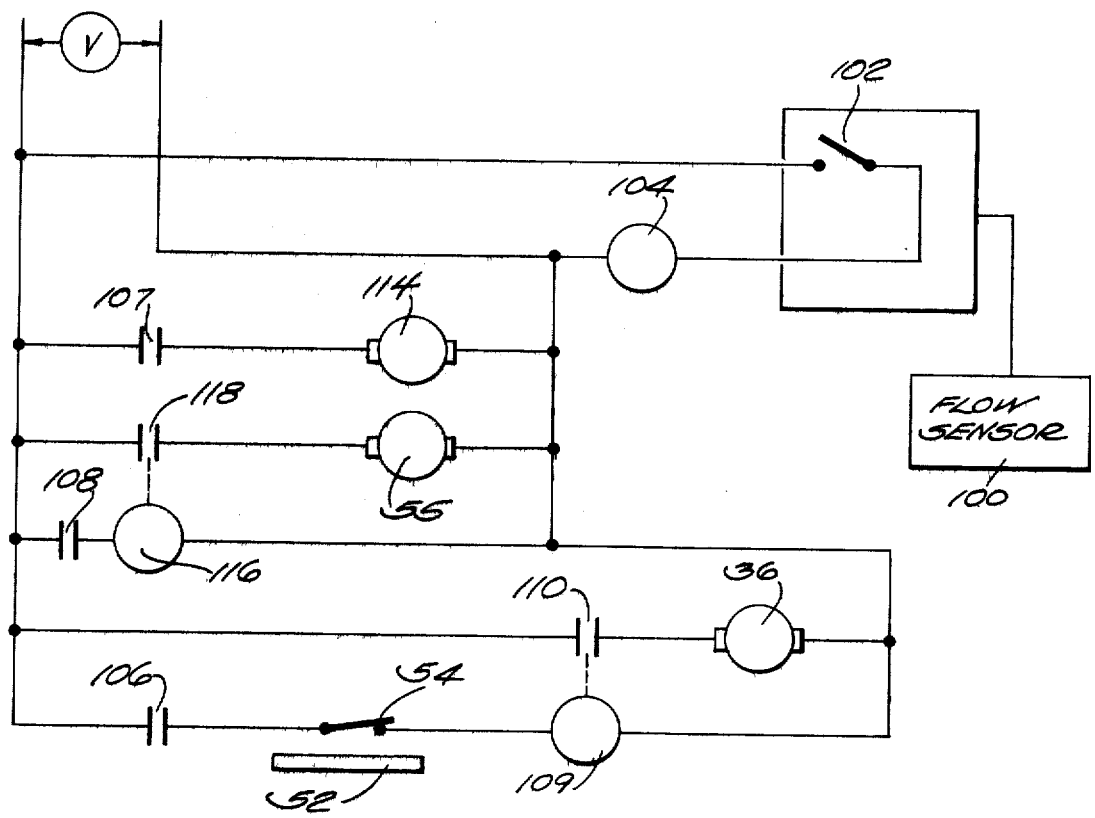
FIG. 6 is a partially schematic and simplified wiring diagram showing a detaching portion of the control circuitry for the detacher mechanism.

The milking machine and detacher are started by the operator after which the teat cups are attached. Referring now to the schematic control circuit shown in FIG. 6, milking continues until the milk flow from the milker unit 12 drops below a predetermined minimum amount (preferably ½ pound per minute), a milk flow sensor 100 (of any suitable design) will then operate to close a switch 102 which in turn will energize a time delay relay coil 104. After the expiration of the time delay built into the relay (preferably 30 seconds) time delay relay switch contacts 106, 107 and 108 will be closed. The closing of contacts 106 will energize relay coil 109 which will close contacts 110 to energize lift motor in the "up" direction. The closing of contacts 107 will energize a motor operated vacuum valve 114 which operates to shut off the vacuum to milker unit 12. The closing of contacts 108 will energize a time delay relay coil 116 which (after a given time delay) will close relay contacts 118 which in turn will energize the retract motor 55. The amount of time delay built into relay coil 116 is sufficient to insure a complete cut off of vacuum at the teat cup before the milker unit is retracted from underneath the cow.

As indicated, the closing of relay contacts 110 will energize lift motor 36 in the "up" direction, causing the milker unit support assembly 24 (and milker unit 12 supported thereon) to be raised by the rotation of threaded rod 30 in collar member 46 as previously described. Reed switch 54 is a normally open switch which is designed to close when a permanent magnet is positioned adjacent thereto. The lift motor 36 will continue to run in the up direction until permanent magnet member 52 moves away from reed switch 54 a sufficient distance to cause the reed switch to open. Thus when the lift motor 36 raises the support tube 28 to the position shown in FIG. 2, the lower end of magnet 52 will have moved past the reed switch 54 causing the reed switch to open which in turn will deenergize the lift motor 36. As indicated previously, by adjusting the vertical position of reed switch 54 on jacket 26, the elevation to which the retractable support assembly 24 is raised during the automatic detaching operation can be adjusted accordingly.

Energization of retract motor 55 will cause chain 88 to be rolled up on drum 56. As the chain is rolled up on the drum, it will be pulled through guide tube 94 and openings 92 and 90 in links 64 and 66 respectively. This movement of the chain will cause the links to be folded from the extended position shown in FIG. 3 to the fully retracted position shown in FIG. 4. Retract motor 55 is of the type which can be stalled without harm to the motor and thus it will be stopped when hub 56 is rotated to the fully retracted position and the chain 88 becomes tight. Vacuum valve motor 114 is a limited turn motor and when energized will run ¼ turn (to shut the valve) and will then stop automatically.

It will be apparent from the foregoing that in the automatic detaching operation described above, the milker unit 12 is first automatically released from the cow due to the shut off of vacuum. Immediately thereafter the milker unit is retracted from underneath the cow by the operation of the retractable support assembly 24. At the same time the milker unit will be raised to a predetermined vertical position by the operation of the lift motor 36, rod 30, collar 46 and tube 28 assembly as described previously. The raising of the milker unit during its retraction from underneath the cow will prevent the detached teat cups from falling down onto the ground area at the stall. This feature is particularly important where a cow with a relatively low udder is being milked.

It will be apparent from the foregoing that the milker unit detacher mechanism of this invention provides a gentle, smooth, positive and quiet retracting action wherein the retractable link assembly is folded into a compact assembly to permit easy access to the cow's udder for prepping the cow prior to attachment of the milker unit.

We claim:

1. A milking unit support and detacher mechanism comprising:
a main support assembly;
a horizontally extending retractable milking unit support assembly mounted on said main support assembly, said milker unit support assembly comprising a plurality of horizontally extending link members pivotally connected together in end-to-end relationship and adapted to support a milker unit on the outer end thereof when the milker unit is attached to a cow for milking, a flexible retract member fastened to one end to the end link member and threaded back through openings in at least two of the other link members, and retract means for pulling on said flexible retract member to cause said link members to fold up on themselves which in turn will cause the milker unit to be retracted from underneath the cow; and
a control means for automatically initiating the actuation of said retract means at a predetermined point in the milking cycle.

2. A milking unit support and detacher mechanism according to claim 1 in which said retract means is comprised of a rotatably mounted hub member and a drive motor therefor, said flexible retract member adapted to be reeled up on said hub member when said hub member is rotated by said drive motor.

3. A milking unit support and detacher mechanism according to claim 2 in which said milker unit support assembly further includes a guide tube mounted adjacent said hub member through which said flexible retract member extends.

4. A milking unit support and detacher mechanism according to claim 1 in which said milker unit support assembly is comprised of four link members with said flexible retract member threaded through openings in the two link members next adjacent said end link member.

5. A milking unit support and detacher mechanism according to claim 1 in which at least two of said link members have offset portions thereon for housing the pivotal connections to the adjacent link, said offset portions being positioned so that when the link assembly is fully retracted the links will assume a compact, parallel relationship.

6. A milking unit support and detacher mechanism according to claim 1 in which said main support assembly includes a vertical adjustment means for adjusting the vertical elevation of said milker unit support assembly mounted thereon.

7. A milking unit support and detacher mechanism according to claim 6 in which said vertical adjustment means includes a vertically extending support member on which said milker unit support assembly is mounted at the lower end thereof and a lift means operatively connected to said vertical support member to drive it up or down as desired.

8. A milking unit support and detacher mechanism according to claim 7 in which said lift means is comprised of a motor drivingly connected to said vertical extending support member by a threaded rod engaged with an internally threaded collar fastened to said vertical support member.

9. A milking unit support and detacher mechanism according to claim 8 in which said main support assembly further includes a tubular jacket member inside of which said vertically extending support member and threaded rod are mounted.

10. A milking unit support and detacher mechanism according to claim 1 in which said control means is operative to shut off the vacuum to the milker unit before said retract means operates to cause said retractable milking unit support assembly to be retracted.

11. A milking unit support and detacher mechanism according to claim 6 in which said control means is operative to automatically actuate said vertical adjustment means in the up direction when said milker unit support assembly is retracted to thereby reduce the likelihood of contact between the milker unit and the ground during retraction thereof.

12. A milking unit support and detacher mechanism according to claim 11 in which the operation of said vertical adjustment means in the up direction is automatically terminated at a predetermined vertical elevation of said milker unit support assembly.

13. A milking unit support and detacher mechanism according to claim 1 in which said retractable milking unit support assembly is mounted on said main support assembly by means of a friction clutch assembly to prevent damage to the mechanism should the retractable milking unit support assembly by subjected to a shock force such as a kick from a cow.

14. A milking unit support and detacher mechanism comprising:
a main support assembly including a tubular jacket member and a support member slidably mounted therein, said assembly further including a vertical adjustment means for adjusting the vertical position of the support member in the jacket, said adjustment means including a lift motor operatively connected to the support member by a threaded rod;
a horizontally extending retractable milking unit support assembly mounted on the lower end of said support member, said milker unit support assembly comprising four horizontally extending link members pivotally connected together in end-to-end relationship and adapted to support a milker unit on the end link thereof when the milker unit is attached to a cow for milking, a flexible retract member fastened at one end to the end link member and threaded back through openings in the two link members next adjacent said end link member, and a retract means for pulling on said flexible retract member to cause said link members to fold up on themselves which in turn will cause the milker unit to be retracted from underneath the cow; and a control means for automatically initiating the actuation of said retract means at a predetermined point in the milking cycle.

15. A milking unit support and detacher mechanism according to claim 14 in which said retract means is comprised of a rotatably mounted hub member and a drive motor therefor, said flexible retract member adapted to be reeled up on said hub member when said hub member is rotated by said drive motor.

16. A milking unit support and detacher mechanism according to claim 14 in which said control means is operative to shut off the vacuum to the milker unit before said retract means operates to cause said retractable milking unit support assembly to be retracted.

17. A milking unit support and detacher mechanism according to claim 16 in which said control means is further operative to automatically actuate said vertical adjustment means in the up direction when said milker unit support assembly is retracted to thereby reduce the likelihood of contact between the milker unit and the ground during retraction thereof.

18. A milking unit support and detacher mechanism according to claim 17 in which the operation of said vertical adjustment means in the up direction is automatically terminated at a predetermined vertical elevation of said milker unit support assembly.

19. A milking unit support and detacher mechanism according to claim 18 in which the automatic termination of the vertical adjustment means is produced by the cooperation between a permanent magnet member attached to said vertical support member and a reed switch mounted on said tubular jacket member.

20. A milking unit support and detacher mechanism according to claim 14 in which said retractable milking unit support assembly is mounted on said main support assembly by means of a friction clutch assembly to prevent damage to the mechanism should the retractable milking unit support assembly be subjected to a shock force such as a kick from a cow.

* * * * *

UNITED STATES PATENT OFFICE
CERTIFICATE OF CORRECTION

Patent No. 3,893,422      Dated July 8, 1975

Inventor(s) JAMES J. SCHNITZLER, GARY W. SCHLUCKBIER and PAUL E. KRUEGE

It is certified that error appears in the above-identified patent and that said Letters Patent are hereby corrected as shown below:

Column 5, line 37:    "fastened to" should read --fastened at--.

Column 6, line 49:    "assembly by" should read --assembly be--.

Signed and Sealed this twenty-seventh Day of January 1976

[SEAL]

Attest:

RUTH C. MASON  
*Attesting Officer*

C. MARSHALL DANN  
*Commissioner of Patents and Trademarks*